C. L. CRUMRINE.
FRUIT PACKAGE.
APPLICATION FILED JUNE 2, 1913.
1,099,281.
Patented June 9, 1914.
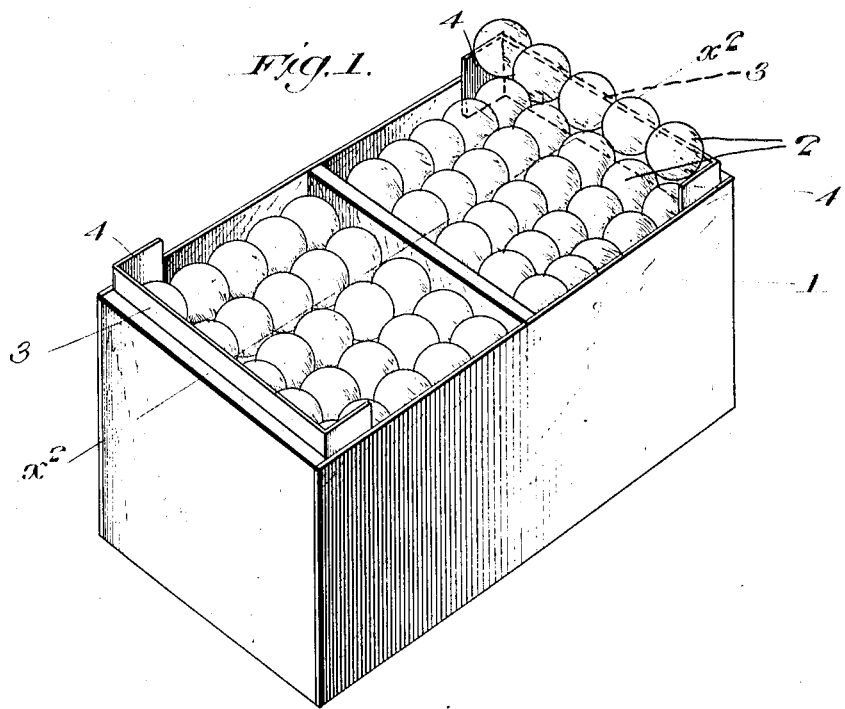
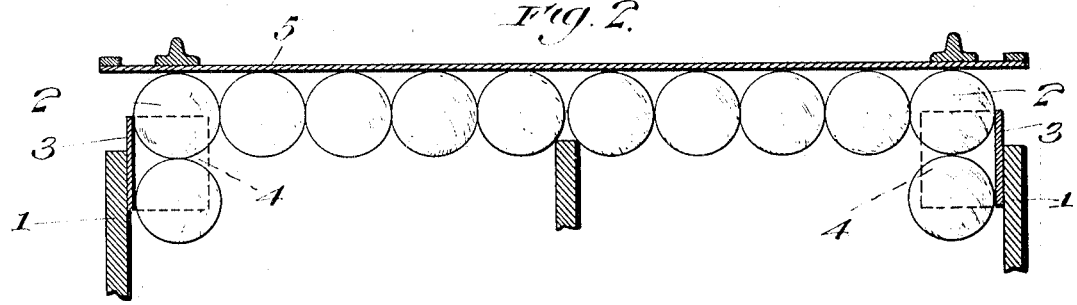
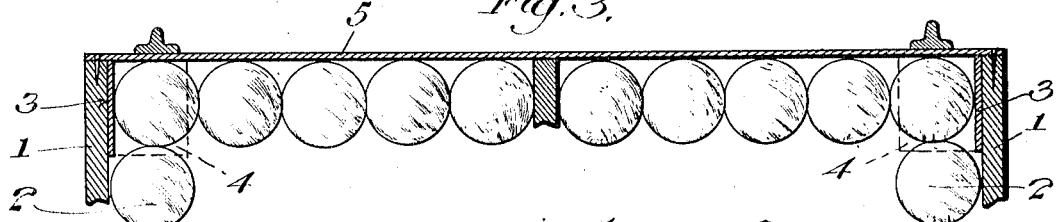
Witnesses:
Inventor
Charles L. Crumrine
by Lyon & Hackley
attys.

UNITED STATES PATENT OFFICE.

CHARLES L. CRUMRINE, OF WHITTIER, CALIFORNIA, ASSIGNOR OF ONE-HALF TO LEFFINGWELL RANCHO, OF WHITTIER, CALIFORNIA, A CORPORATION OF CALIFORNIA.

FRUIT-PACKAGE.

1,099,281. Specification of Letters Patent. Patented June 9, 1914.

Application filed June 2, 1913. Serial No. 771,323.

*To all whom it may concern:*

Be it known that I, CHARLES L. CRUMRINE, a citizen of the United States, residing at Whittier, in the county of Los Angeles, State of California, have invented a new and useful Fruit-Package, of which the following is a specification.

This invention relates to a fruit package especially designed for oranges, lemons and other fruit having delicate skins which are liable to be bruised, during the process of boxing. In boxing oranges, for example, the oranges in the upper layer project considerably above the edges of the box, and overlap the edges of the box; so that when the cover of the box is laid upon the oranges and pressed down into position, those oranges which are on top frequently have their skins squeezed between the cover and the upper edges of the box, with the result that the bruise to the skin causes decay very quickly.

The specific object of the present invention is to provide a means which becomes a part of the package itself, and which serves to prevent the upper fruit from being thus damaged.

Referring to the drawings: Figure 1 is a perspective view of a box of oranges equipped with my invention, the cover being removed, the upper layer of oranges, except the extreme right hand row, having also been removed. Fig. 2 is a vertical section on line $x^2$—$x^2$, Fig. 1, showing the position of the fruit and protecting guards before the cover is applied. Fig. 3 is a view similar to Fig. 2, showing a portion of the fruit and protecting guards after the cover has been secured. Fig. 4 is a perspective view of a guard in detail.

The fruit package comprises a box 1 of any preferred construction.

2 designates the fruit which is contained in the box, and which before the cover is applied, projects over the upper edge of the box, as clearly shown in Figs. 1 and 2.

3 designates guards, which I arrange at each end of the box, each guard preferably consisting of a sheet of flexible material; preferably a self-supporting; such, for example, as card-board. Each guard is formed with wings 4 at each end at right angles, and the guards fit between the fruit and the box, as shown, and are vertically slidable. Before the cover is applied, the guards project up above the box a sufficient distance to at least cover the outermost projecting portions of the fruit above the upper edges of the box; while the lower portions of the guards extend below the edge of the box enough to hold them in proper position. The cover 5 is then applied and pressed down and nailed. When the cover is pressed down, it forces down the oranges, compressing them compactly together into the box, and at the same time the cover presses against the upper edges of the guards, and presses the guards down; so that those oranges which are in contact with the guards move down with the guards and are prevented by the guards from coming in contact with the edges of the box, and are kept from being bruised. Another important point is that the guards move down with the oranges, so that there is no relative sliding movement of the oranges with respect to the guards, and abrasion of the skin of the oranges is thus prevented. The guards are extremely inexpensive, and form a perfect means of preventing the skin from being bruised.

While I have shown and described the invention as applied to the packing of oranges, it will be understood that its use is not limited to that particular kind of fruit; but that it may, with equal advantage, be employed in packing lemons and other fruit.

What I claim is:

1. A fruit package comprising a box adapted to hold the fruit, and a guard comprising a sheet of material arranged between the upper fruit and the upper edge of the box adapted to be caused to slide down inside the box to hold the fruit out of contact with the upper edge of the box when the cover is applied.

2. A fruit package comprising a box for holding the fruit, a sheet of flexible, self-supporting material, arranged between the upper edge of the box and the upper fruit, and adapted to be pressed down by the cover with the fruit when the cover is applied, and keep the fruit from contact with the edge of the box.

3. A fruit package comprising a box for holding the fruit, a guard consisting of a sheet of self-supporting, flexible material having inturned wings at each end thereof; said guard being arranged between the edge of the box and the fruit, with its winged portions fitting the corners of the box, said guard preventing contact of the fruit with the edge of the box when the cover is applied.

4. A fruit package comprising a box adapted to hold oranges or the like, guards comprising sheets of material arranged slidably at the ends of the box, said guards projecting above the box with their upper edges substantially as high as the greater horizontal diameter of the upper layer of oranges which extend above the edge of the box before the cover is applied, said guards being moved down with the upper layer of oranges when the cover is applied, and preventing the oranges from coming in contact with the edges of the box, the said upper oranges and guards being depressed by the downward contact of the cover against the oranges and upper edges of the guards, whereby the oranges and guards are caused to move down at the same speed and without relative movement between them avoiding abrasion of the skins of the oranges.

In testimony whereof, I have hereunto set my hand at Los Angeles, California this 13 day of May, 1913.

CHARLES L. CRUMRINE.

In presence of—
MARTHA M. LANGE,
LORA M. BOWERS.